United States Patent [19]

Ward et al.

[11] Patent Number: 5,363,195
[45] Date of Patent: Nov. 8, 1994

[54] AUTOMATIC GAIN CALIBRATION SYSTEM FOR A PHASE MODULATOR IN A FIBER OPTIC GYRO

[75] Inventors: Paul A. Ward, Waltham; Joseph G. Walsh, Cambridge, both of Mass.

[73] Assignee: The Charles Stark Draper Laboratory, Inc., Cambridge, Mass.

[21] Appl. No.: 996,724

[22] Filed: Dec. 24, 1992

[51] Int. Cl.[5] .............................................. G01C 19/72
[52] U.S. Cl. ........................................ 356/350; 332/145
[58] Field of Search ............................... 356/345, 350; 250/227.19, 227.27; 385/12; 332/16 R, 17, 26

[56] References Cited

U.S. PATENT DOCUMENTS 4,796,993 1/1989 Sonobe et al. .................... 356/350

Primary Examiner—Samuel A. Turner
Attorney, Agent, or Firm—Joseph S. Iandiorio; Kirk Teska

[57] ABSTRACT

An automatic gain calibration system for a phase modulator for forcing a predetermined phase shift amplitude includes a phase modulator responsive to an applied voltage for modulating the phase of a radiation beam. The frequency spectrum of the modulated radiation beam is converted to the electrical domain where a selected even harmonic of the spectrum is nulled. The scaling circuit then responds to the amplitude of voltage applied to the phase modulator that obtains the phase shift which produced the nulling of the selected even harmonic and scales that voltage to generate the predetermined phase shift amplitude which is desired.

22 Claims, 3 Drawing Sheets

AUTOMATIC GAIN CALIBRATION SYSTEM FOR A PHASE MODULATOR IN A FIBER OPTIC GYRO

FIELD OF INVENTION

This invention relates to an automatic gain calibration system for a phase modulator for forcing a predetermined phase shift amplitude, and more importantly to such a system which utilizes the known phase shift amplitude at a selected even harmonic to scale the forced predetermined phase shift amplitude. In one adaptation the invention relates to a phase amplitude compensation system for a fiber optic gyroscope for forcing a $2\pi$ radian phase shift amplitude.

BACKGROUND OF INVENTION

In conventional interferometric fiber optic gyroscopes (IFOG's), a laser through an optical "Y" junction provides a clockwise and a counter-clockwise propagating beam to the gyroscope ring. The interference pattern generated by the two counter-propagating beams in response to the inertial rate of rotation of the ring is directed by a directional coupler to a photodetector. While the amplitude of the fundamental frequency component of the detector output represents the rate of rotation of the gyroscope, it suffers from a number of shortcomings. The signal is proportional to the cosine of the inertial rate and so lacks sensitivity at small rates. Also, since the cosine is a multivalued function there is an ambiguous relationship between the actual and indicated rate: a given signal could represent many different rates, thus restricting the reliable dynamic range of the gyroscope to less than one cosine cycle. In addition, since the cosine is an even function there is also ambiguity as to polarity. Further, the indicated rate output is very sensitive to variations in optical power or electronic gains: any change in the optical power or gain can be misinterpreted as a change in rate.

To overcome these problems a periodic non-reciprocal phase modulation, such as a sinusoid, is applied to one of the counter-propagating beams. This resolves the polarity uncertainty in the indicated rate signal by effecting a gyroscope output which is proportional to the sine of the rate as opposed to the cosine. It also eliminates the sensitivity to optical power at zero rate.

However, there are still additional problems. The ambiguity is partially present because the sine is also a multivalued function. And there is still sensitivity to optical power at other than zero rates. To address these problems a serrodyne input is applied which introduces to the beam a non-reciprocal phase shift that exactly cancels the rate induced phase caused by the rotation of the gyroscope ring. The serrodyne input simulates (to first order) an infinite ramp which would increase indefinitely; the serrodyne is reset periodically by a flyback voltage equivalent to $2\pi$ radians. Since the flyback of $2\pi$ radians effects a full cycle change in phase it minimizes the phase discontinuity at flyback. However, the optical phase modulator gain can drift so that at different times the serrodyne flyback voltage will result in different optical phase shifts that deviate from the desired $2\pi$. The net result is gyroscope scale factor drift. One approach to this problem involves optically summing a portion of the serrodyne phase shifted beam with a portion of non-phase shifted light. The result is an interference pattern which yields a sinusoidal function of phase shift introduced by the serrodyne. This sinusoid can be used to adjust the serrodyne flyback amplitude to once again produce a $2\pi$ radian phase shift. See U.S. Pat. No. 4,662,751. However, this approach requires at least two additional optical couplers, an optical "Y" junction and an additional photodetector, and results in additional complex electronics.

SUMMARY OF INVENTION

It is therefore an object of this invention to provide an improved automatic gain calibration system for a phase modulator for forcing a predetermined phase shift amplitude.

It is a further object of this invention to provide such an automatic gain calibration system which automatically, continuously compensates for gain shift in the phase modulator.

It is a further object of this invention to provide such an automatic gain calibration system which is simple and inexpensive.

It is a further object of this invention to provide such an automatic gain calibration system which inherently fixes the peak phase shift introduced by the modulating signal.

It is a further object of this invention to provide such an automatic gain calibration system which operates independently of the range of the gain of the phase modulator.

It is a further object of this invention to provide such an automatic gain calibration system which eliminates the need for second harmonic filtering in the primary signal path.

It is a further object of this invention to provide such an automatic gain calibration system which is applicable to a phase amplitude compensation system for a fiber optic gyroscope.

It is a further object of this invention to provide such a phase amplitude compensation system for a fiber optic gyroscope which compensates for optical modulator gain drift.

It is a further object of this invention to provide such a phase amplitude compensation system for a fiber optic gyroscope which compensates for optical modulator gain drift without additional optical components and with little additional electronics.

It is a further object of this invention to provide such a phase amplitude compensation system for a fiber optic gyroscope which inherently fixes the peak phase shift introduced by the modulating signal.

It is a further object of this invention to provide such a phase amplitude compensation system for a fiber optic gyroscope which operates independently of the range of the gain of the optical modulator.

It is a further object of this invention to provide such a phase amplitude compensation system for a fiber optic gyroscope which eliminates the need for second harmonic filtering.

The invention results from the realization that a truly simple and effective automatic gain calibration system for a phase modulator for forcing a predetermined phase shift amplitude can be achieved by noting the fixed fundamental phase shift that occurs at an even harmonic null, such as that of the second harmonic, and scaling the (fundamental) voltage amplitude which caused the modulator to induce that phase shift to obtain a voltage to produce any other desired phase shift, thereby automatically, continuously compensating for gain drift in the modulator, and more particularly from the realization that such a system can be applied to a fiber optic gyroscope to provide such compensation for gain drift of the optical phase modulator such as, for example, by forcing the serrodyne flyback value to $2\pi$ radians regardless of modulator gain drift.

This invention features an automatic gain calibration system for a phase modulator for forcing a predetermined phase shift amplitude. There is a phase modulator responsive to an applied voltage for modulating the phase of a radiation beam, and there are means for converting the frequency spectrum of the modulator radiation beam to the electrical domain. Means, responsive to the means for converting, to null a selected even harmonic of that spectrum. There are means responsive to the voltage applied to the phase modulator, which voltage obtains the phase shift producing the nulling of the selected even harmonic, for scaling that voltage to generate the predetermined phase shift amplitude.

In a preferred embodiment, the radiation beam may be an optical beam or other electromagnetic beam such as an r.f. beam. The means for converting may include a phase discriminator for converting phase variations to amplitude variations, and a power detector for converting the amplitude variations to an electrical signal. When the radiation beam is an optical beam the phase discriminator may include an optical summing junction and the power detector may include a photodetector. The nulling circuit may include a bandpass filter for selecting an even harmonic, a synchronous demodulator for extracting the even harmonic amplitude, and an integral compensator for nulling the even harmonic. The means for scaling may include a d.c. amplifier. The phase modulator may include a sensor phase nulling circuit, a bias phase modulation generator, and a summing means for combining the output from the sensor phase nulling circuit and the bias phase modulation generator for driving the phase modulator. The sensor phase nulling circuit may include a sawtooth wave generator and the bias phase modulation generator may include a summing means. The means for scaling may respond to the amplitude of the voltage applied to the bias phase modulation generator and apply a voltage to the sensor phase nulling circuit. The even harmonic may be the second harmonic.

The invention also features a phase amplitude compensation system for a fiber optic gyroscope which includes a phase modulator responsive to the applied voltage for modulating the phase of the gyroscope optical beam. There are means for converting the frequency spectrum of the modulated beam to the electrical domain and means responsive to the means for converting for nulling the selected even harmonic of that spectrum. There are means responsive to the voltage applied to the phase modulator, which voltage obtains the shift producing the nulling of the selected even harmonic, for scaling that voltage to generate the predetermined phase shift amplitude.

Again, the means for converting may include a phase discriminator for converting phase variations to amplitude variations and a power detector for converting the amplitude variations to an electrical signal. The phase discriminator may include an optical summing junction and the power detector may include a photodetector. The nulling circuit may include a bandpass filter for selecting an even harmonic, a synchronous demodulator for extracting the even harmonic amplitude, and an integral compensator for nulling the even harmonic. The means for scaling may include a d.c. amplifier, the phase modulator may include a sensor phase nulling circuit, a bias phase modulation generator, and a summing means for combining the output from the sensor phase nulling circuit and the bias phase modulation generator for driving the phase modulator. The sensor phase nulling circuit may include a sawtooth wave generator and the bias phase modulation generator may include a sine generator. The means for scaling may respond to the voltage applied to the bias phase modulation generator and in turn apply a voltage to the sensor phase nulling circuit. The even harmonic may be the second harmonic.

The invention more specifically features a phase amplitude compensation system for a fiber optic gyroscope for forcing a $2\pi$ radian phase shift amplitude. A phase modulator responsive to an applied voltage modulates the phase of the gyroscope optical beam. There are means for generating the frequency spectrum of the optical beam including a phase discriminator for converting phase variations to amplitude variations, and a power detector for converting the amplitude variations to an electrical signal. There are means responsive to the electrical signal for nulling the second harmonic of the spectrum and there is a sawtooth generator for driving the phase modulator to null the rotationally induced phase shift in the gyroscope optical beam. The sinusoidal bias modulation generator drives the phase modulator to introduce the frequency spectrum to the optical beam. There are means, responsive to the amplitude of the bias modulation sinusoid at the sinusoidal bias modulation generator, which induce the phase shift that nulled the second harmonic for scaling that amplitude to generate a d.c. voltage which represents a $2\pi$ radian phase shift. That d.c. voltage is supplied to the sawtooth generator to define the peak-to-peak sawtooth voltage necessary to obtain a $2\pi$ radian phase shift.

DISCLOSURE OF PREFERRED EMBODIMENT

Other objects, features and advantages will occur to those skilled in the art from the following description of a preferred embodiment and the accompanying drawings, in which.

The automatic gain calibration system for a phase modulator which forces a predetermined phase shift amplitude may be accomplished in a phase amplitude compensation system for a fiber optic gyroscope which forces a predetermined, for example a $2\pi$ radian, phase shift in amplitude. There is a phase modulator responsive to an applied voltage for modulating the phase of the gyroscope optical beam, which has been split at a Y junction to provide two counter-propagating beams to the gyroscope ring. There are means for generating the frequency spectrum of the optical beam which includes a phase discriminator such as the optical Y junction for converting phase variations to amplitude variations, and a power detector such as a photodetector for converting the amplitude variations to an electrical signal. There are means responsive to the electrical signal for nulling the second harmonic of the spectrum. There is also means for nulling the first harmonic of the spectrum. The means for nulling the first harmonic has its output delivered to drive the frequency of a sawtooth generator, which in turn drives the phase modulator to null the rotationally induced phase shift in the gyroscope optical beam caused by the rotation of the ring. The sinusoidal bias modulator generator, such as a sine wave generator, is also used to drive the phase shift modulator to introduce the frequency spectrum to the optical beam. A scaling circuit such as a conventional amplifier, or operational amplifier, responds to the amplitude of the bias modulation sinusoid at the sinusoidal bias modulation generator, that is, the sine wave generator, which amplitude induced the phase shift that nulled the second harmonics and scales that amplitude to generate a d.c. voltage which represents for example a $2\pi$ radian phase shift, and supplies that particular d.c. voltage to the sawtooth generator to define the peak-to-peak sawtooth voltage that will produce the desired phase shift, for example $2\pi$ radians.

Figure 1:
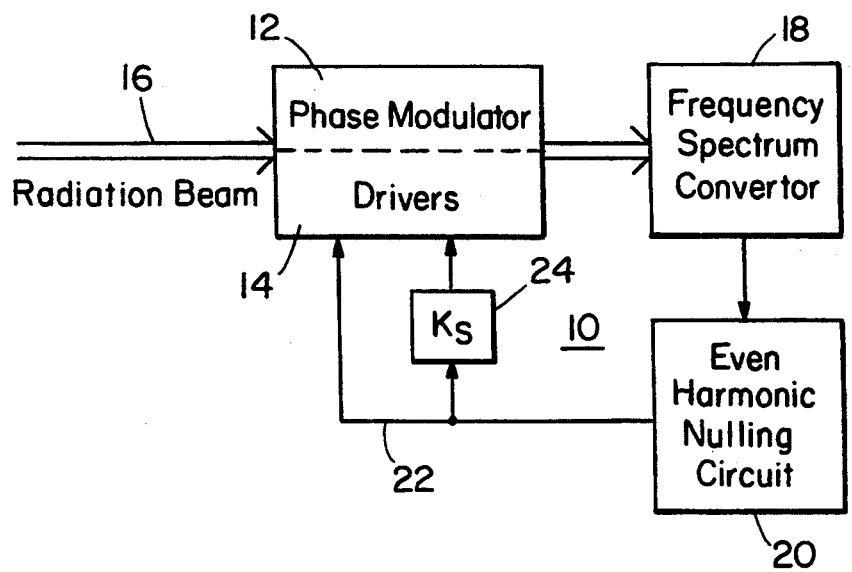
FIG. 1 is a block diagram of an automatic gain calibration system for a phase modulator according to this invention.

There is shown in FIG. 1 an automatic gain calibration system for a phase modulator for forcing a predetermined phase shift amplitude. The system 10 includes a phase modulator 12 including drivers 14 which drive phase modulator 12 to modulate the phase of radiation beam 16 which may, for example, be an optical beam or a microwave beam. After modulation the beam is submitted to a frequency spectrum converter 18 which produces a spectrum at its output whose amplitudes are determined by the Bessel functions and converts those amplitudes from the domain of the radiation beam to that of electrical signals. The output of converter 18 is delivered to even harmonic nulling circuit 20 which nulls a selected even harmonic. When the even harmonic is nulled, the signal on line 22 represents the voltage required to obtain the particular well-defined phase shift amplitude that results in the nulling of the selected even harmonic. Now, since the voltage is known to obtain a specific phase shift amplitude commensurate with the selected even harmonic, scaling factor circuit 24 can be used to obtain the voltage to induce any other desired predetermined phase shift amplitude. This is done simply by having scaling circuit 24 sense the voltage on line 22 that is causing the known amplitude shift and scaling that voltage up or down as required to obtain the predetermined phase shift amplitude that is desired.

Figure 2:
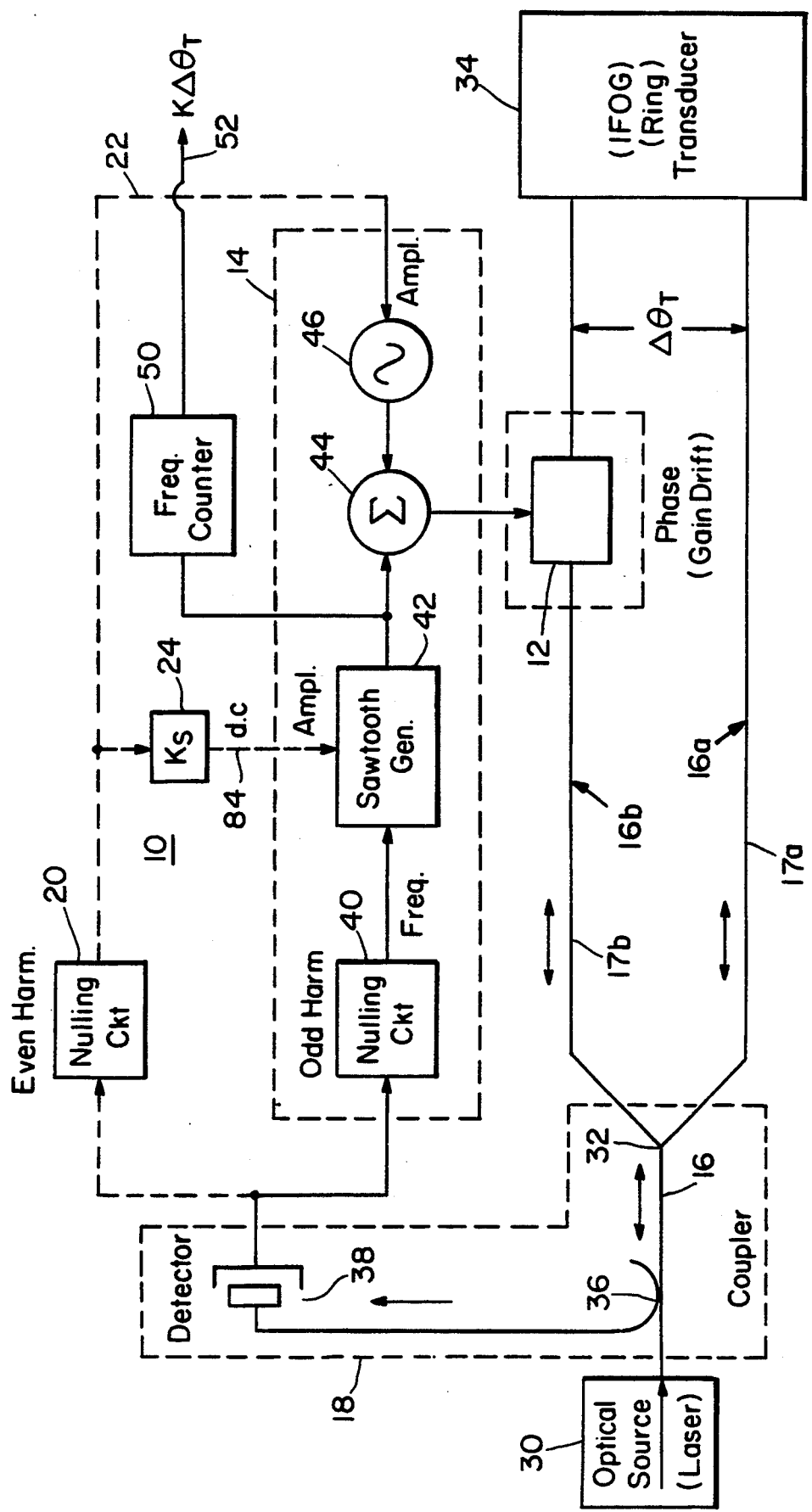
FIG. 2 is a more detailed block diagram of an automatic gain calibration system for a phase modulator according to this invention employed in a fiber optic gyroscope system.

This can be better understood with respect to a specific embodiment of the invention employed in a fiber optic gyroscope such as a resonant fiber optic gyroscope (RFOG) or an interferometric fiber optic gyroscope (IFOG). One such example using an interferometric fiber optic gyroscope is shown in FIG. 2. A radiation source such as optical source 30, which may be a laser for example, provides beam 16 which is split at Y junction 32 into two beams 16a and 16b in legs 17a and 17b, respectively. Beams 16a, 16b counter-propagate in the ring 34 of the interferometric fiber optic gyroscope. The beams are modulated in leg 17b by means of phase modulator 12. Any rotation of ring 34 causes a differential phase shift at junction 32 which creates an interference pattern. This is delivered through coupler 36 to a detector such as photodetector 38. In this way the phase information is converted to an amplitude signal at junction 32 and the amplitude signal is converted to an electrical signal at detector 38.

In a conventional interferometric fiber optic gyroscope the output from detector 38 is fed to an odd harmonic nulling circuit 40 which acts to feed back a signal to null typically the first harmonic. This signal is delivered to sawtooth generator 42 which acts as a sensor phase nulling circuit whose output is summed in summer 44 with the output from sine generator 46 that acts as a bias phase modulation generator. The combination of the two signals is fed to phase modulator 12 which then modulates the beam in leg 17b. When the phase difference at junction 32 is nulled, then the frequency of the output of the sawtooth generator 42 represents the rate of rotation of the ring 34 of the interferometric fiber optic gyroscope and its frequency can be counted by frequency counter 50 to provide an output proportional to gyroscope rate on line 52.

Figure 3:
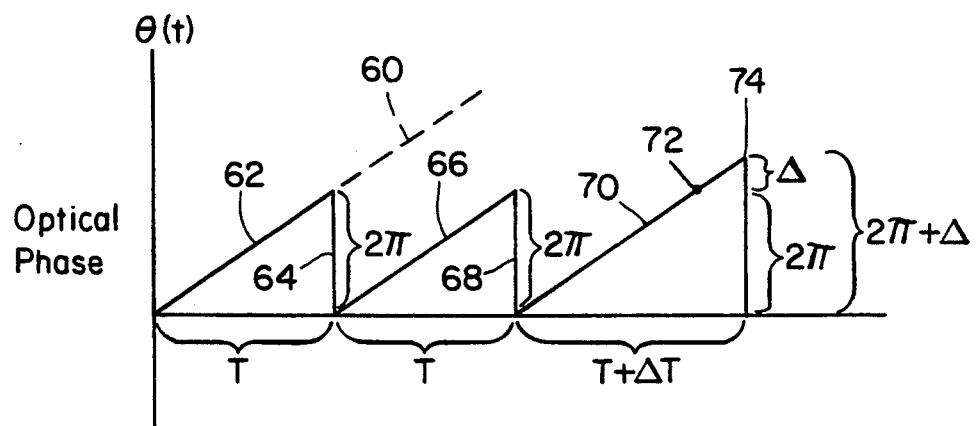
FIG. 3 is an illustration of the optical phase sawtooth waveform illustrating the control of the $2\pi$ flyback amplitude according to this invention.

In order to obtain a frequency signal which represents the rate of rotation of ring 34, a phase shift is introduced by the sawtooth generator through phase modulator 12, which just cancels the phase shift caused by the rotation of the ring 34. Ideally, a sawtooth generator is not needed; a simple ramp 60 as shown in FIG. 3 would suffice, except that the ramp would have to continue upwardly indefinitely and so practically speaking would exceed the power supply voltages in the circuit. To accommodate this the conventional prior art periodically resets the ramp in order to remain within the limits of the power supply. The flyback is accomplished at $2\pi$ radians to minimize phase discontinuity. As is conventionally known, a constant serrodyne phase modulation slope 60 results in a constant phase shift because the counter-propagating beams 16a and 16b are modulated at different times.

This conventional system, however, suffers from gain sensitivity in the phase modulator 12. Thus it works well as long as the phase modulator always produces the same optical phase shift in response to the same voltage inputs. However this is not generally the case: the optical gain of the phase modulator drifts. In the ideal case the sawtooth moves up ramp 62, FIG. 3, and flies back a distance of $2\pi$ at 64, and repeats this continuously as indicated by ramp 66 and flyback 68. However, occasionally the phase modulator 12 will produce a different output for the same voltage input: that is, its gain will change. When this occurs, for example when the output optical phase has a greater magnitude than it previously had for the same voltage, ramp 70 extends beyond the normal maximum 72 to a new maximum 74 so that when a flyback occurs it results in an increased period $(T+\Delta T)$, as compared with the periods of the previous ramps which were simply $T$. The result is a scale factor error.

In accordance with this invention, the scale factor circuit 24, for example an amplifier, constantly monitors the voltage on line 22 to the sine generator 46 and nulling circuit 20 constantly acts to null an even harmonic, for example the second harmonic. The second harmonic 80 as shown in FIG. 4, is proportional to a Bessel function $J_2(2\theta_P)$, where $\theta_P$ is the amplitude of the bias phase modulation generator or sine generator 46.

Figure 4:
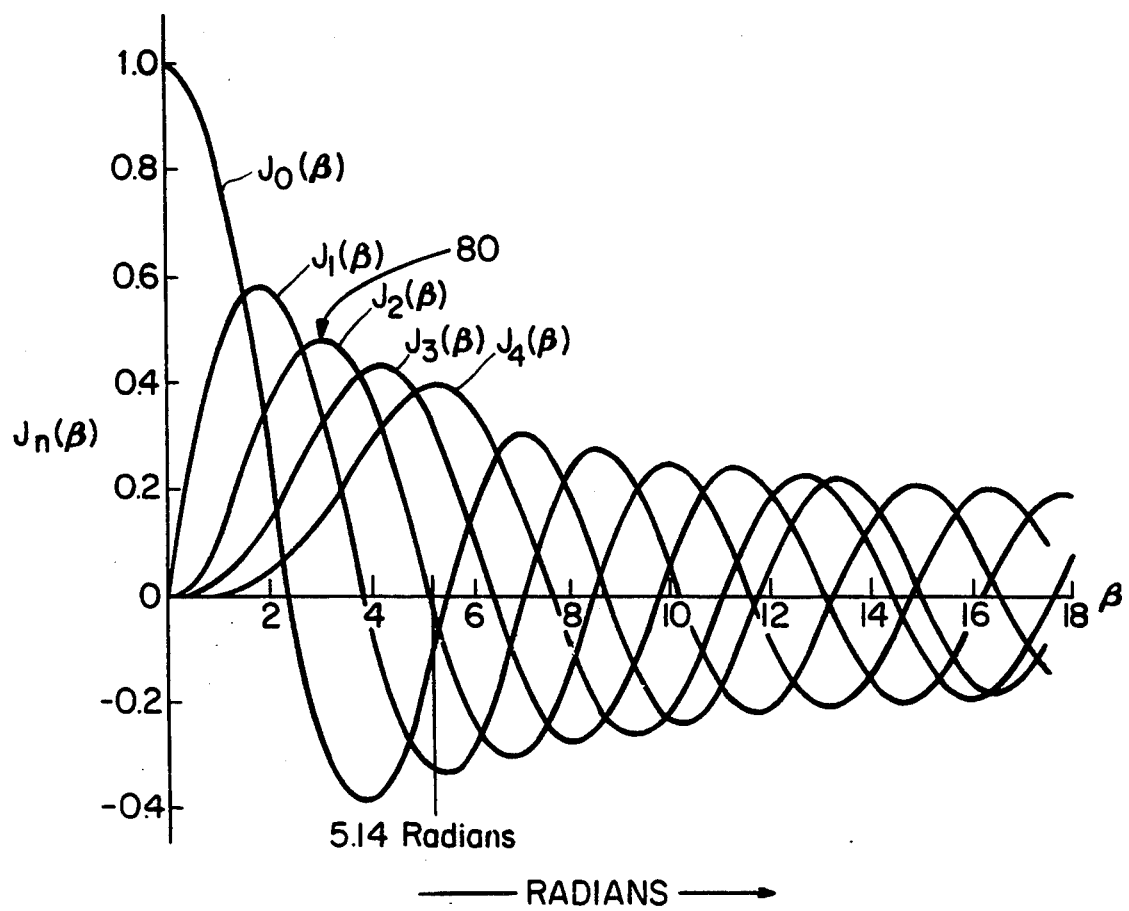
FIG. 4 is a plot of the Bessel functions illustrating the relationship between the nulling of the second harmonic and the fundamental phase in radians applied to obtain that nulling.

Since as shown in FIG. 4 the second harmonic is null at $2\theta_P$ equal to 5.14 radians, it can be seen that $\theta_P$ is equal to 2.57 radians. Thus in FIG. 2, when nulling circuit 20 nulls the second harmonic, that indicates unequivocally that phase modulator 12 has introduced a phase modulation of 2.57 radians. Scale factor circuit 24 then senses the voltage on line 22 and knows that at that voltage, whatever it is (for example, 3 volts), phase modulation induced is exactly 2.57 radians. Thus in order to obtain a value of any other value, such as $2\pi$ radians in this specific case, scaling circuit 24 need only scale its d.c. voltage output on line 84 to sawtooth generator 42, e.g., 7.33 volts. In this particular case the expression can be simply phrased as the scale factor $K_S$ equals $2\pi$ divided by 2.57. In a more general case, $K_S$ equals the desired phase shift in radians, $\theta_D$, divided by the nulling phase shift $\theta_N$ in radians. Thus the sawtooth has a peak phase of exactly $2\pi$ radians regardless of how the phase modulator 12 gain may drift, and the scale factor is completely stabilized.

Figure 5:
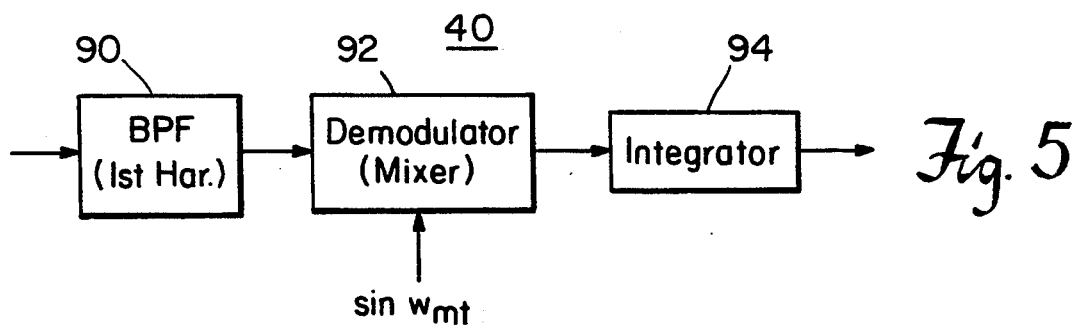
FIG. 5 is a more detailed block diagram of the odd harmonic nulling circuit of FIG. 2.
Figure 6:
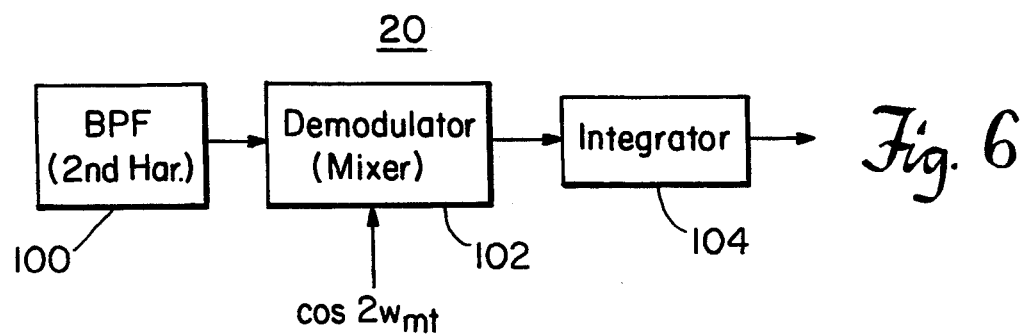
FIG. 6 is a more detailed block diagram of the even harmonic nulling circuit of FIG. 2.

The nulling circuit 40, FIG. 5, actually includes a bandpass filter 90 which selects the first harmonic, and a demodulator 92 which mixes the first harmonic with the sine of $\omega_{mt}$, where $\omega_m$ represents the bias phase modulation sine wave frequency, that is, the frequency of the modulation imposed on beam 16. The resulting output of demodulator 92 is proportional to the sine of the phase at junction 32 and when nulled produces the correct frequency output at frequency counter 50. The output of demodulator 92 is delivered to integrator 94 which produces a nulled phase difference at the Y junction 32 by driving the sawtooth generator 42. It is this action that provides the frequency output to frequency counter 50 that represents the rate of rotation of the gyroscope ring 34. Similarly, the even harmonic nulling circuit 20, FIG. 6, includes a bandpass filter 100 that selects the second harmonic and delivers it to demodulator 102 which mixes it with the cosine of $2\omega_{mt}$ to provide a signal to integrator 104 that is used to null the second harmonic by driving the amplitude of the bias phase modulation or sine generator 46.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An automatic gain calibration system for a phase modulator for forcing a predetermined phase shift amplitude, comprising:
   a phase modulator responsive to an applied voltage for modulating the phase of a radiation beam;
   means for converting the frequency spectrum of the modulated radiation beam to the electrical domain;
   means, responsive to said means for converting, for nulling a selected even harmonic of said spectrum; and
   means, responsive to the voltage applied to said phase modulator, which voltage obtains the phase shift produced by the nulling of said selected even harmonic, for scaling that voltage to generate the predetermined phase shift amplitude.

2. The automatic gain calibration system of claim 1 in which said radiation beam is an optical beam.

3. The automatic gain calibration system of claim 1 in which said radiation beam is a microwave beam.

4. The automatic gain calibration system of claim 1 in which said radiation beam is a radio frequency beam.

5. The automatic gain calibration system of claim 1 in which said means for converting includes a phase discriminator for converting phase variations to amplitude variations, and a power detector for converting the amplitude variations to an electrical signal.

6. The automatic gain calibration system of claim 5 in which said radiation beam is a optical beam, said phase discriminator includes an optical summing junction, and said power detector includes a photodetector.

7. The automatic gain calibration system of claim 1 in which said means for nulling includes a bandpass filter for selecting an even harmonic, a synchronous demodulator for extracting the even harmonic amplitude and an integral compensator for nulling the even harmonic.

8. The automatic gain calibration system of claim 1 in which said means for scaling includes a d.c. amplifier.

9. The automatic gain calibration system of claim 1 in which said phase modulator includes a sensor phase nulling circuit, a bias phase modulation generator, and summing means for combining the output from said sensor phase nulling circuit and said bias phase modulation generator for driving said phase modulator.

10. The automatic gain calibration system of claim 9 in which said sensor phase nulling circuit includes a sawtooth wave generator and said bias phase modulation generator includes a sine generator.

11. The automatic gain calibration system of claim 9 in which said means for scaling responds to the voltage applied to said bias phase modulation generator and applies a voltage to said sensor phase nulling circuit.

12. The automatic gain calibration system of claim 1 in which said even harmonic is the second harmonic.

13. A phase amplitude compensation system for a fiber optic gyroscope comprising:
    a phase modulator responsive to an applied voltage for modulating the phase of the gyroscope optical beam;
    means for converting the frequency spectrum of the modulated beam to the electrical domain;
    means, responsive to said means for converting, for nulling a selected even harmonic of said spectrum; and
    means responsive to the voltage applied to said phase modulator, which voltage obtains the shift producing the nulling of said selected even harmonic, for scaling that voltage to generate the predetermined phase shift amplitude.

14. The phase amplitude compensation system for a fiber optic gyroscope of claim 13 in which said means for converting includes a phase discriminator for converting phase variations to amplitude variations, and a power detector for converting the amplitude variations to an electrical signal.

15. The phase amplitude compensation system for a fiber optic gyroscope of claim 14 in which said phase discriminator includes an optical summing junction and said power detector includes a photodetector.

16. The phase amplitude compensation system for a fiber optic gyroscope of claim 13 in which said means for nulling includes a bandpass filter for selecting an even harmonic, a synchronous demodulator for extracting the even harmonic amplitude and an integral compensator for nulling the even harmonic.

17. The phase amplitude compensation system for a fiber optic gyroscope of claim 13 in which said means for scaling includes a d.c. amplifier.

18. The phase amplitude compensation system for a fiber optic gyroscope of claim 13 in which said phase modulator includes a sensor phase nulling circuit, a bias phase modulation generator, and summing means for combining the output from said sensor phase nulling circuit and said bias phase modulation generator for driving said phase modulator.

19. The phase amplitude compensation system for a fiber optic gyroscope of claim 18 in which said sensor phase nulling circuit includes a sawtooth wave generator and said bias phase modulation generator includes a sine generator.

20. The phase amplitude compensation system for a fiber optic gyroscope of claim 18 in which said means for scaling responds to the voltage applied to said bias phase modulation generator and applies a voltage to said sensor phase nulling circuit.

21. The phase amplitude compensation system for a fiber optic gyroscope of claim 13 in which said even harmonic is the second harmonic.

22. A phase amplitude compensation system for a fiber optic gyroscope for forcing a $2\pi$ radian phase shift amplitude, comprising:

a phase modulator for modulating the phase of the gyroscope optical beam;

means for generating the frequency spectrum of the optical beam including a phase discriminator for converting phase variations to amplitude variations; and a power detector for converting the amplitude variations to an electrical signal;

means, responsive to said electrical signal, for nulling the second harmonic of said spectrum;

a sawtooth generator for driving said phase modulator to null the rotationally induced phase shift in the gyroscope optical beam;

a sinusoidal bias modulation generator for driving said phase modulator to introduce the frequency spectrum to the optical beam; and means, responsive to the amplitude of the bias modulation sinusoid at said sinudsoidal bias modulation generator, which induced the phase shift that nulled the second harmonic, for scaling that amplitude to generate a d.c. voltage which represents a $2\pi$ radian phase shift and supply that d.c. voltage to said sawtooth generator to define the peak-to-peak sawtooth voltage.

* * * * *